No. 706,506. Patented Aug. 5, 1902.
M. D. ELLIS.
APPARATUS FOR PRESERVING FOODS.
(Application filed Sept. 16, 1901.)
(No Model.)
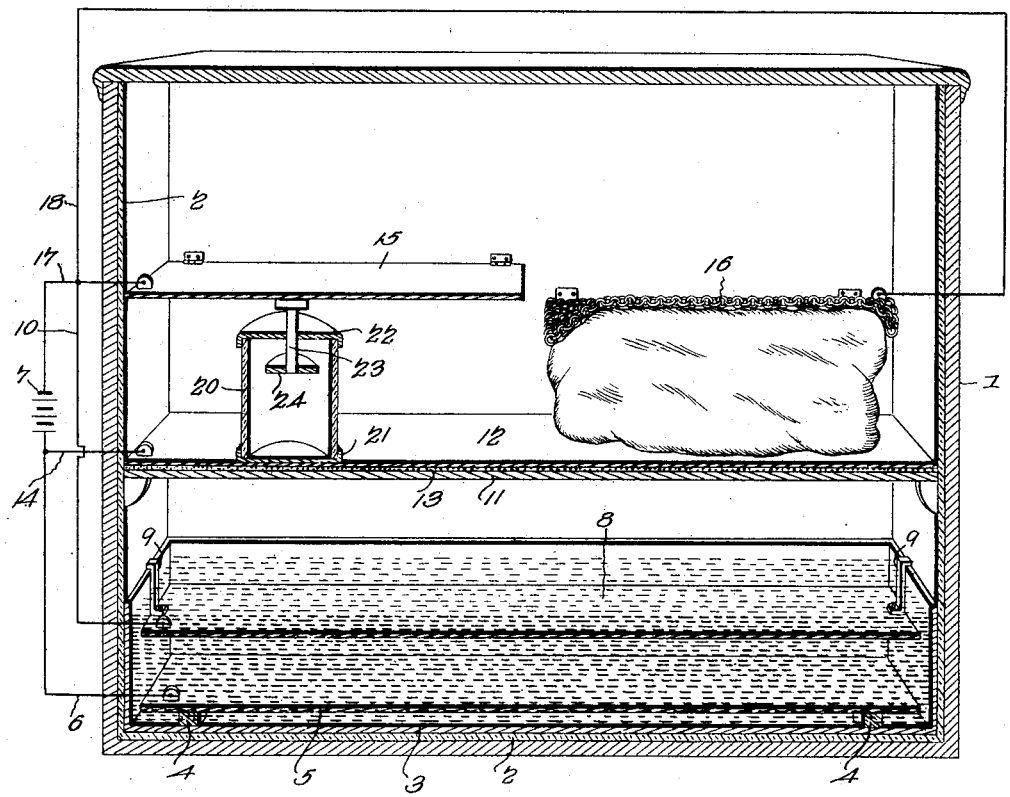
Witnesses
Marshall D. Ellis, Inventor
by C. A. Snow & Co.
Attorneys

UNITED STATES PATENT OFFICE.

MARSHALL D. ELLIS, OF CONGRESS HEIGHTS, DISTRICT OF COLUMBIA, ASSIGNOR OF ONE-HALF TO GUY M. FIELD, OF HIGHPOINT, NORTH CAROLINA.

APPARATUS FOR PRESERVING FOODS.

SPECIFICATION forming part of Letters Patent No. 706,506, dated August 5, 1902.

Application filed September 16, 1901. Serial No. 75,536. (No model.)

*To all whom it may concern:*

Be it known that I, MARSHALL D. ELLIS, a citizen of the United States, residing at Congress Heights, in the city of Washington and District of Columbia, have invented a new and useful Apparatus for Preserving Food, of which the following is a specification.

The object of my invention is to destroy by the passage of an electric current all germs and bacteria in meat and other organic food and food products, liquids, and all substances liable to decay or deterioration by the propagation of bacteria and micro-organisms of the destructive type. To this end I employ an improved apparatus in which the various substances may be placed and there subjected to the action of a current of electricity of a tension sufficient to destroy any microbes or germs with which they may be infected.

The accompanying drawing illustrates an apparatus constructed in accordance with my invention.

Referring to the drawing, 1 indicates a suitable casing or cabinet, which may be in the form of a refrigerator, having the usual door or doors. The bottom and side walls of the casing are lined with glass or other suitable non-conductive material 2. At the bottom of the casing is arranged a tank 3, which may be formed of non-conducting material or, if preferred, of metal. When formed of metal, the tank must be insulated from the body of the cabinet in order to prevent the grounding of the current employed in the process of the preserving. In the lower portion of the tank and supported on spaced blocks 4 of glass or similar material is a metallic plate 5, connected by a conductor 6 to one terminal of a source of electrical energy 7, which may be in the form of a dynamo or a battery of sufficient strength. In the upper part of the tank a similar metallic plate 8 is suspended by hangers 9, preferably formed of insulating material and adapted to hold the plate submerged in the liquid with which the tank is filled. This portion of the apparatus may be employed for the treatment of water, milk, or other liquids containing germs which it is desired to destroy, or the liquid may be employed simply as a conductor for conveying the current to and through meat, vegetables, or other organic substances which may be placed within the tank at a point between the two plates. The plate 8 is connected by a suitable conductor 10 to the battery or dynamo 7, or it may return by a ground-wire, if desired.

At a point above the tank is a shelf 11, supporting an upper metallic plate 12, which may be properly insulated from the shelf by a layer 13 of asbestos or similar material. This shelf is adapted for the reception and support of meat or other substances to be treated, and its conducting-plate 12 is connected by a wire 14 to the battery or dynamo 7. To the rear wall of the casing, at a point above the contact-plate 12, are hinged two conductors 15 16, connected by suitable conducting-wires 17 and 18 to one terminal of the battery or dynamo, and said conductors are adapted to make contact with the upper portion of any substances which may be placed upon the plate 12 for treatment.

To provide for good electrical contact with articles of irregular shape, the conductor 16 is flexible in its character, being preferably formed of woven chain, and will adapt itself to the irregularities in the upper surface of the article being treated. The conductor 15, which is adapted for contact with articles having flat upper surfaces, is hinged at its rear end and is movable vertically to accommodate articles of varying height. This plate, if necessary, may be entirely disconnected from the casing and may be placed on and supported by the article being treated.

In order to provide for the treatment of small quantities of material of liquid or semi-liquid nature, I provide a jar or containing vessel 20, formed of a glass cylinder having a lower fixed metallic plate 21, which makes mechanical and electrical contact with the plate 12. The top of the jar is closed by a removable cap or cover 22, formed of any suitable material and provided with a suitable opening for the passage of a metallic rod 23, provided at its lower end at a point within the jar with a disk 24, of conducting material, which makes contact with the contents of the jar. The upper end or head of the rod 23 is also of metal and is adapted for contact with the movable plate 15.

The apparatus may be employed for the treatment of substances of any character, and by the passage of a current of sufficient strength all of the germs with which the articles may be infected will be entirely destroyed.

In some instances the flexible conductor 16 may be provided with a rigid supporting-frame hinged to the rear of the casing or entirely disconnected therefrom, as desired.

Any suitable switches or other current making and breaking devices may be employed on the various line-wires, and such devices may be arranged for operation by the opening and closing of the door of the receptacle, if desired.

Having thus described my invention, what I claim is—

1. In an apparatus for the purpose described, the combination of the casing, a rigid shelf or support having a conducting-surface, a circuit including a source of electrical energy having one terminal connected to said conducting-surface, and a movable conductor adapted to fall by gravity into contact with any substance located on said shelf, said movable conductor being connected to the opposite terminal of the circuit to thereby compel the passage of a current through the substance being treated.

2. In an apparatus for the purpose described, a casing having insulated walls, a fixed shelf or support arranged within the casing and having a conducting-surface, a circuit including a source of electrical energy, one terminal of said circuit being formed by said conducting-surface, a flexible conductor pivotally connected at one side or edge to one of the insulated walls at a point above the shelf or support and adapted to move by gravity into contact with a substance placed on the shelf or support for treatment, said flexible conductor forming the opposite terminal of the circuit to thereby compel the passage of a current through the substance being treated.

3. An apparatus for the purpose described, comprising a casing, a shelf arranged within the casing and having a conducting-surface, a movable conductor formed of a series of interwoven metallic links adapted to move into contact with the material to be treated and to conform itself by gravity to the contour of such material, and an electric circuit having its terminals connected to the shelf and to the flexible conductor.

In testimony that I claim the foregoing as my own I have hereto affixed my signature in the presence of two witnesses.

MARSHALL D. ELLIS.

Witnesses:
C. E. DOYLE,
FRANK S. APPLEMAN.